(12) United States Patent
Ogutcu et al.

(10) Patent No.: US 12,467,471 B2
(45) Date of Patent: Nov. 11, 2025

(54) IMPELLER DESIGN FOR SUBMERSIBLE CENTRIFUGAL WASTEWATER PUMPS

(71) Applicant: EYS ENDUSTRI MAKINA SANAYI VE TICARET ANONIM SIRKETI, Aydin (TR)

(72) Inventors: Erinc Ogutcu, Aydin (TR); Engin Orcun Kozaka, Aydin (TR)

(73) Assignee: EYS ENDUSTRI MAKINA SANAYI VE TICARET ANONIM SIRKETI, Aydin (TR)

( * ) Notice: Subject to any disclaimer, the term of this patent is extended or adjusted under 35 U.S.C. 154(b) by 0 days.

(21) Appl. No.: 18/835,040

(22) PCT Filed: Nov. 23, 2022

(86) PCT No.: PCT/TR2022/051346
§ 371 (c)(1),
(2) Date: Aug. 1, 2024

(87) PCT Pub. No.: WO2024/058737
PCT Pub. Date: Mar. 21, 2024

(65) Prior Publication Data
US 2025/0243872 A1      Jul. 31, 2025

(30) Foreign Application Priority Data

Sep. 15, 2022   (TR) ................. 2022/014271

(51) Int. Cl.
*F04D 29/22*   (2006.01)
*F04D 7/04*    (2006.01)
*F04D 29/24*   (2006.01)

(52) U.S. Cl.
CPC ........... *F04D 29/2288* (2013.01); *F04D 7/04* (2013.01); *F04D 7/045* (2013.01);
(Continued)

(58) Field of Classification Search
CPC ...... F04D 7/045; F04D 29/2288; F04D 13/14; F04D 17/00–122; F04D 29/162–167;
(Continued)

(56) References Cited

U.S. PATENT DOCUMENTS

| 4,936,744 A * | 6/1990 | Dosch ...................... D21D 5/26 |
| | | 415/24 |
| 6,405,748 B1 * | 6/2002 | Muhs .................. F04D 29/2288 |
| | | 137/574 |
| 2017/0306965 A1 | 10/2017 | Bevington |

FOREIGN PATENT DOCUMENTS

| CH | 717512 A1 | 12/2021 |
| CN | 205036593 U | 2/2016 |

(Continued)

OTHER PUBLICATIONS

CN-110792632—Translation (Year: 2020).*
DE-10050108—Translation (Year: 2002).*
EP-3922855—Translation (Year: 2021).*

*Primary Examiner* — Courtney D Heinle
*Assistant Examiner* — Behnoush Haghighian
(74) *Attorney, Agent, or Firm* — Bayramoglu Law Offices LLC

(57) ABSTRACT

An impeller for use in a volute part of a pump transports fluid between two predetermined locations by converting mechanical energy into flow energy using at least one drive unit.

5 Claims, 4 Drawing Sheets

(52) U.S. Cl.
CPC ........ *F04D 29/2216* (2013.01); *F04D 29/242* (2013.01); *F05D 2240/303* (2013.01)

(58) Field of Classification Search
CPC ..... F04D 29/22–247; F04D 29/28–305; F04D 29/42–506; F04D 29/62–628
See application file for complete search history.

(56) References Cited

FOREIGN PATENT DOCUMENTS

| | | | | |
|---|---|---|---|---|
| CN | 110792632 A | * | 2/2020 | |
| DE | 10050108 A1 | * | 6/2002 | ......... F04D 29/2288 |
| EP | 3922855 A1 | * | 12/2021 | ......... F04D 29/2288 |
| EP | 3971422 A1 | | 3/2022 | |
| WO | 2021260974 A1 | | 12/2021 | |

\* cited by examiner

IMPELLER DESIGN FOR SUBMERSIBLE CENTRIFUGAL WASTEWATER PUMPS

CROSS REFERENCE TO RELATED APPLICATIONS

This application is a national stage entry of International Application No. PCT/TR2022/051346, filed on Nov. 23, 2022, which is based upon and claims foreign priority to Turkey Patent Application No. 2022/014271, filed on Sep. 15, 2022, the entire contents of which are incorporated herein by reference.

TECHNICAL FIELD

The invention relates to an impeller to be used inside submersible pumps for transporting fluids between two predetermined locations by transferring mechanical energy to working fluid in order to increase total head, using at least one drive unit.

BACKGROUND

A submersible pump is of the type that operates in the fluid or environment in which it will be used. Submersible pumps are mainly composed of two sub-assemblies, the drive unit and the hydraulic unit. The drive unit is mounted adjacent to the hydraulic components namely the impeller and the volute. Since the submersible pump is in direct contact with the liquid, the motor is configured with several technical features. One of these specifications is that it has a waterproof housing. Areas of use for submersible pumps include water supply, irrigation and sprinkler systems, groundwater level control and detection studies, pressurization of clean or less polluted waters in heat pump applications, transport locations of animal wastes, transport locations of liquids containing solid parts, etc. Impellers are responsible for the aforementioned energy transfer. This transfer is achieved by increasing the angular momentum of the working fluid while it passes through the rotating impeller.

Application No. WO2021260974 known in the literature relates to a submersible pump for minimizing the formation of blockages. A non-blocking pump is provided with a pump body, an impeller comprising a main plate part, a blade part, and a central protruding part. When the pump structures in the current art are examined, it is seen that they encounter some problems during the transportation of the fluid. One of these problems is the obstructions experienced during the transportation of the fluid. In an application such as the transportation of raw organic fertilizer or various types of animal manure, pumps transportation capacity may decrease when fibrous materials are present in the working fluid. Depending on their length these fibrous structures may possibly wrap around the hub or the leading edge of the impeller, which causes some issues. Firstly, the effective suction area decreases and chokes the pump entrance, which in turn decreases the capacity. Secondly, the fibrous material may deform the surface of the impeller blade and cause flow separation, which inhibits the angular momentum transfer. In the worst-case scenario, the impeller may be stuck and stop rotating, which causes overheating of the drive unit and eventual failure of the system. In the current art, the decrease in energy efficiency in pump systems due to these clogging problems and irregular changes in the amount of pumping capacity due to the clogging, reduces the quality of the pumping system.

As a result, the problems mentioned in this section have made it necessary to make an innovation in the relevant technical field.

SUMMARY

The present invention relates to an impeller for use in fluid transport, in order to eliminate the above-mentioned disadvantages and to bring new advantages to the related technical field.

One object of the invention is to provide an impeller for the disintegration of solid elements in the fluid.

Another object of the invention is to provide an impeller for preventing or at least partially reducing the clogging problem in submersible pumps.

In order to achieve the aforementioned objectives and those which will arise from the following detailed description, the present invention is a novel impeller, designed to be used in a submersible pump. This invention helps transferring and pressurizing fluids, contaminated with fibrous materials, between two predetermined locations using at least one drive unit. Accordingly, the novelty of the present invention is that the said impeller comprises at least one hub and at least one connection part on the said hub for coupling said impeller with the said drive unit, at least one blade that is at least partially wrapped around the said hub and built by stacking curved streamlines until reaching the shroud. At least one leading edge on the sides of the said blade, the said leading edges being provided in a protrusion form and facing backward counter clockwise in a vertical axis as it moves away from the hub on the impeller, a first angle and a trailing edge with the hub to form a vacuum region around the blade, at least one impeller cover associated in a neighboring manner in the volute, at least one shaped part formed in accordance with the surface form of the impeller on the said impeller cover, and at least one cutting channel in the form of a recess to allow the solid elements in the fluid to break down on the said shaped part. Thus, it is ensured that the solid parts taken between the impeller and the impeller cover are disintegrated during transportation and discharged with the fluid.

A possible embodiment of the invention is characterized in that it may be comprised of up to three separate blades. Thus, the hydraulic efficiency of the impeller is increased.

A possible embodiment of the invention is characterized in that the said cutting channel has a predetermined curved form. Thus, the cutting performance of the impeller and the shroud are improved.

Another possible embodiment of the invention is characterized in that there are 6 cutting channels on the shroud. Thus, the cutting speed is increased and discharge of solid particles and fibrous materials are handled while the overall hydraulic efficiency of the pump is kept over a certain level.

REFERENCE NUMBERS GIVEN IN THE FIGURES

- 10 Pump
- 11 Drive Unit
- 12 Volute
- 13 Discharge Opening
- 20 Impeller
- 21 Hub
- 22 Connection Part
- 23 Threaded Part
- 30 Blade
- 30a First Blade
- 30b Second Blade
- 30c Third Blade
- 31 Leading Edge
- 32 Vacuum Region
- 33 Protrusion Form
- 34 First Angle
- 35 Trailing Edge
- 40 Impeller Cover
- 41 Suction Eye
- 42 Shaped Part
- 43 Cutting Channel
- (I) Horizontal Axis
- (II) Vertical Axis
- (SYT) Counter Clockwise
- (Y) Streamline

DETAILED DESCRIPTION OF THE EMBODIMENTS

In this detailed description, the subject matter of the invention is explained only by means of examples that will not have any limiting effect for a better understanding of the subject matter.

Figure 1:
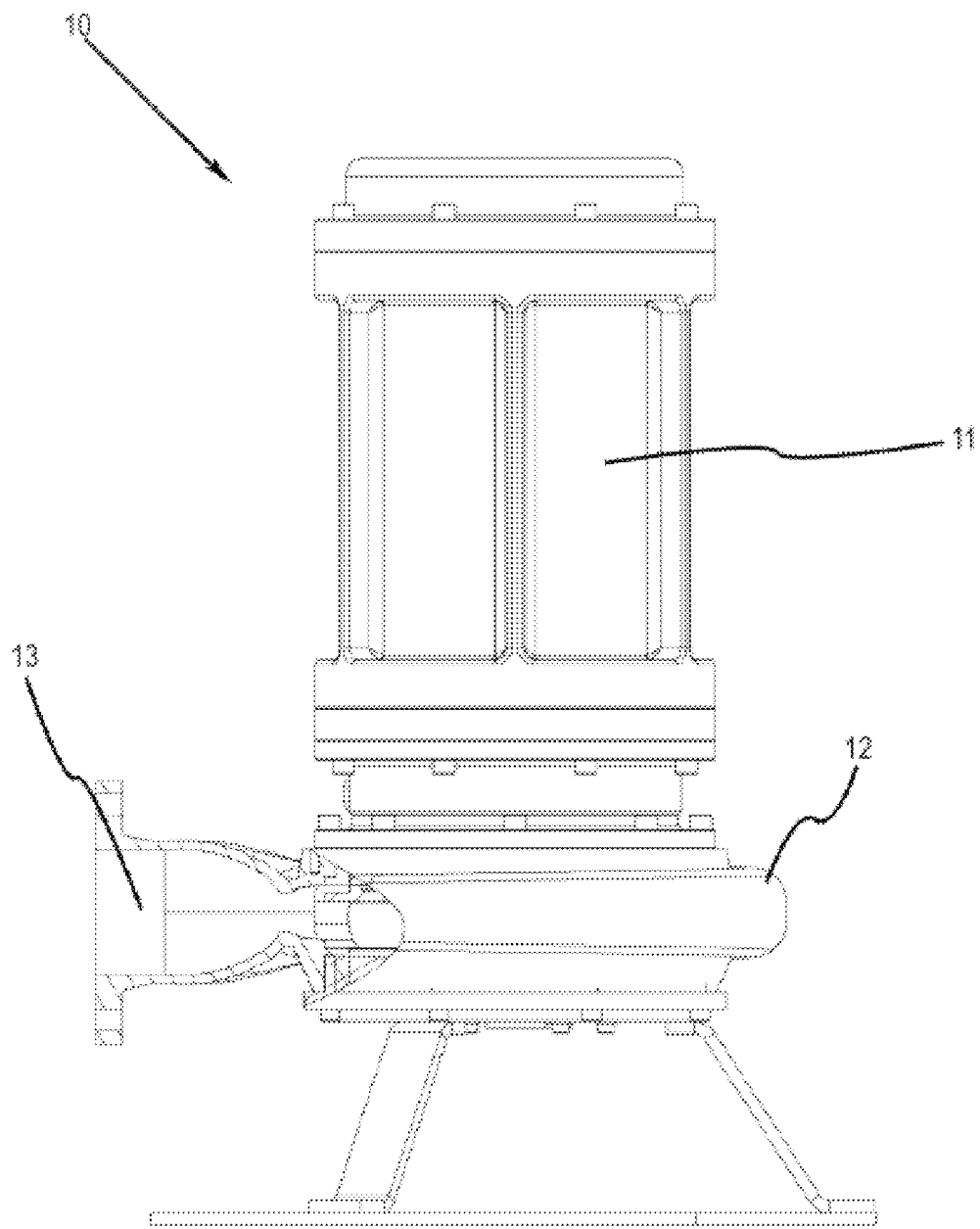
FIG. 1 illustrates a representative perspective view of the pump on which the impeller of the invention is positioned.

FIG. 1 illustrates a representative perspective view of the pump (10) on which the impeller (20) of the invention is positioned. Accordingly, the said pump (10) allows fluid to be transferred between two predetermined locations and at least partially pressurized during such transport. The pump (10) is preferably a submersible pump (10) known in the art. The submersible pump (10) is positioned inside the fluid and allows the fluid to be moved from one place to another. There is at least one drive unit (11) on the pump (10) for this purpose. The said drive unit (11) converts the electrical energy into mechanical energy for the transportation of the fluid. There is at least one volute (12) part on the side of the pump (10) that is in contact with the fluid. The said volute (12) directs the fluid while maintaining its angular momentum with a reasonable loss coefficient in a closed volume. In order to transfer mechanical energy to the working fluid, the impeller (20) of the invention is positioned in the center of the volute (12) at a coincident axis. The impeller (20) advances the fluid by rotating around impeller's symmetry axis and hence increasing fluids angular momentum across the radial direction and passes it to the volute (12) and allows it to be transported through a discharge opening (13).

Figure 2:
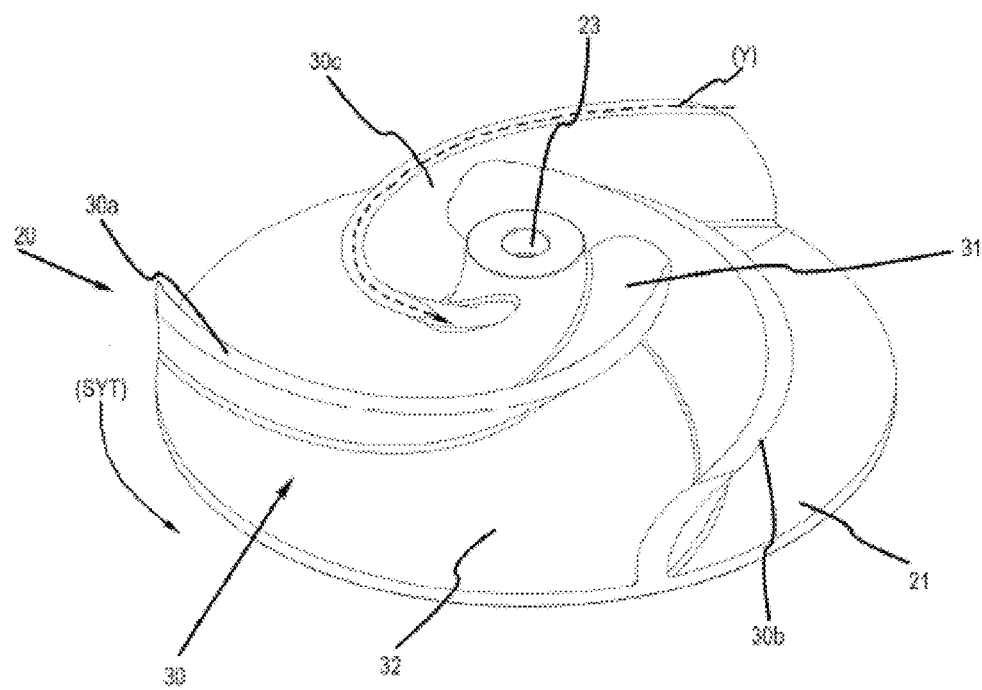
FIG. 2 illustrates a representative perspective view of the impeller of the invention.

FIG. 2 illustrates a representative perspective view of the impeller (20) of the invention. Accordingly, the inventive impeller (20) prevents the pump (10) from being clogged by chopping the solid and fibrous materials in the transported fluid as well as transferring mechanical energy to the fluid. There is at least one hub (21) on the impeller (20) structure and at least one connection part (22) on the said hub (21). It is hereinafter assumed that the hub (21) has a horizontal axis (I) in the extending plane and that the hub (21) has a vertical axis (II) that intersects the extending plane perpendicularly and passes over the connection part (22). The said hub (21) is essentially cylindrically symmetric and formed by a revolution of inner meridional contour around axis (II). This hub (21) provides a closed volume in the volute (12) while the impeller (20) is rotated around axis (II) by the drive unit (11). The said connection part (22) provides the connection of the impeller (20) with the drive unit (11). For this purpose, a threaded part (23) may be provided on the connection part (22), which allows the impeller (20) to be connected to the drive unit (11). The impeller (20) is provided with a blade (30). The said blade (30) comprises a plurality of blades including a first blade (30a), a second blade (30b), and a third blade (30c). The first blade (30a), the second blade (30b), and the third blade (30c) are co-shaped. The first blade (30a), the second blade (30b), and the third blade (30c) are placed over the hub surface at equidistant angles on the impeller (20). The shape of the blade (30) is formed by stacking up streamlines on more than one co-surface (meridional surface) between these two surfaces, including the surface of the connection part (hub surface) (22) and the impeller cover (40) surface, with angle distributions that will create a specific pressure distribution for the collecting fibrous materials towards the mid-streamline to avoid jamming in between impeller cover (40) and volute. For this purpose, in a possible embodiment of the invention, the first blade (30a), the second blade (30b), and the third blade (30c) have at least one leading edge (31) on their sides facing the connection part (22). The blade (30) structures start with the leading edge (31) on the pump (10). The said leading edges (31) are leaned against the connection part (22) from the sides facing the hub (21), and they are positioned in such a way that they move away from the connection part (22) as the horizontal axis (I) and vertical axis (II) move towards their opposite sides. In other words, the leading edges (31) are formed by a 3D original curve that is tilted backward in the counter clockwise direction (SYT), with the axis value increasing on the vertical axis (II) from the hub (21) surface to the impeller cover (40) surface. The purpose of this tilted leading edge curve is to create a negative pressure gradient with increasing radial distance from hub (21) towards impeller cover (40). The cylindrical cross-sectional forms of the leading edges (31) are elliptical.

The elliptical shape of the leading edges (31) improves the performance characteristics during fluid transport and solid particle disintegration. The first blade (30a), the second blade (30b), and the third blade (30c) are positioned around the connection part (22) in such a way that they move away from each other on the horizontal axis (I). During the advancement of the first blade (30a), the second blade (30b), and the third blade (30c) from the leading edge (31) to the trailing edge (35), a shape is formed on the vertical axis (II), which is predicted to collect fibrous structures with the unique angle distributions given over the co-surfaces. To define this shape, a virtual streamline (Y) and trailing edge (35) are defined. The said streamline (Y) is the assumed work allusion that extends in a curved manner between the connection part (22) and the periphery of the hub (21). The unique design of the first blade (30a), the second blade (30b), and the third blade (30c), formed as a stack of streamlines with unique angular distributions over the length of the said streamlines on vertical axis (II) provides efficient energy transfer (10) and better handling (i.e. jam free) of the impurities inside the working fluid compared to the impeller

(20) designs known in the present art. For this purpose, the streamline is curved in a predetermined form. The amount of curvature on the streamline (Y) is at the maximum level between the connection part (22) and the ends of the hub (21).

The first blade (30a), the second blade (30b), and the third blade (30c) have at least one vacuum region (32) between them. The vacuum region (32) is between the side of the blades (30) facing the suction eye (41) (suction side) and the other lower surface (pressure side) of the blades (30). Increase in the angular momentum in the region between two consecutive blades (30) is achieved by the pressure difference between these two surfaces. This vacuum region (32) allows the fluid to be sucked, retained and removed from the discharge opening (13) when the impeller (20) rotates counter clockwise (SYT).

Figure 3:
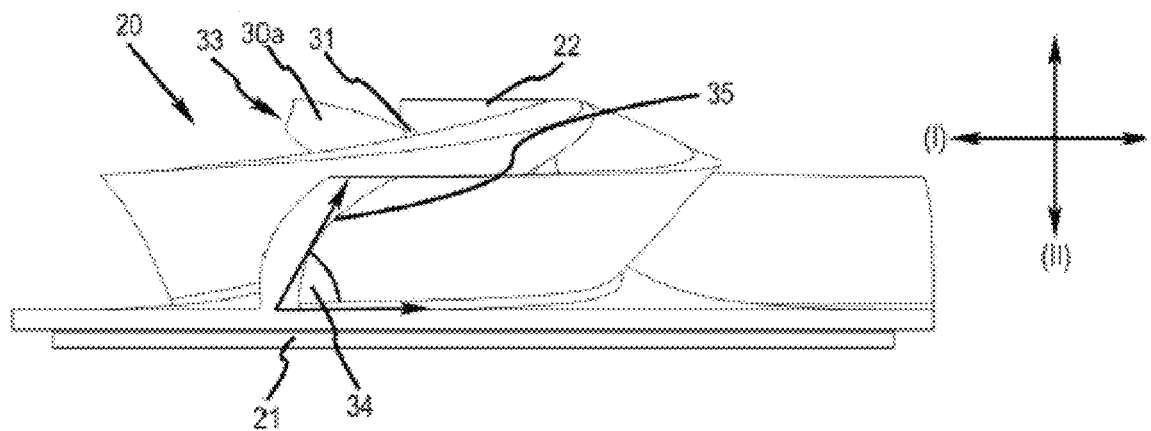
FIG. 3 illustrates a representative side view of the impeller of the invention.

FIG. 3 illustrates a representative side view of the impeller (20) of the invention. Accordingly, when the impeller (20) is viewed from the side, it is seen that the first blade (30a), the second blade (30b), and the third blade (30c) have at least one protrusion form (33) as they approach the connection part (22). The said protrusion form (33) is the part of the first blade (30a), the second blade (30b), and the third blade (30c) extending outward from the hub (21) at the fluid inlet part on the volute (12). The protrusion form (33) improves the suction and particle shredding properties of the impeller (20). The region with the most protrusion form (33) corresponds to the leading edge (31).

When the section profiles of the first blade (30a), the second blade (30b), and the third blade (30c) are examined, it is seen that they are positioned with respect to the hub (21) in the form of a predetermined first angle (34) and trailing edge (35). The trailing edge (35) is uniquely shaped in such a way as to collect the fibrous materials in the center of the trailing edge (35) with the least pressure loss and to prevent them from jamming at the edge of the hub (21) and the rear part on the vertical axis (II) and also from getting stuck between the impeller cover (40) and the impeller (20). The first angle (34) and the trailing edge (35) extend along the streamline (Y) of the first blade (30a), the second blade (30b), and the third blade (30c), and may vary depending on the streamline.

Figure 4:
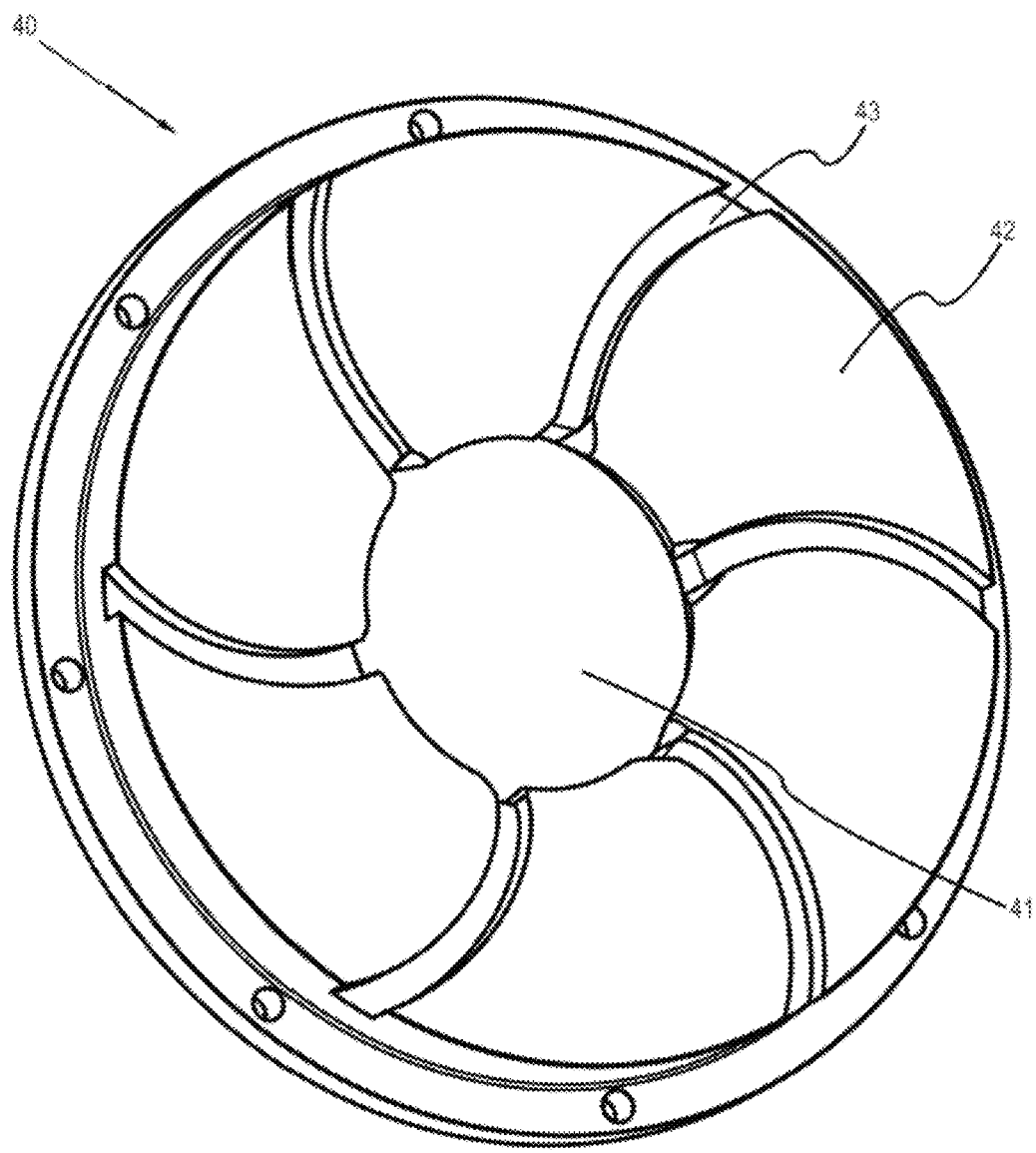
FIG. 4 illustrates a representative perspective view of at least one shroud cover formed from the revolution of impellers outer meridional section.
Figure 5:
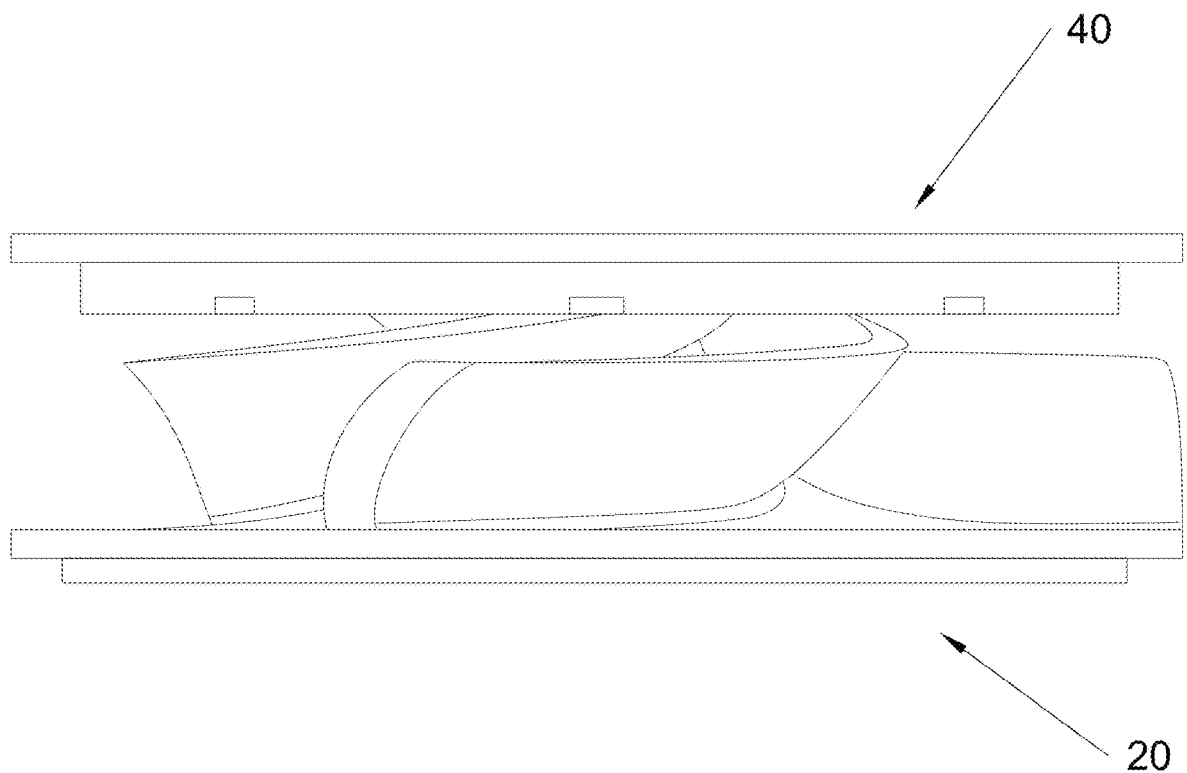
FIG. 5 illustrates a representative impeller and an assembled impeller cover.

FIG. 4 illustrates a representative perspective view of at least one impeller cover (40) shaped using the same meridional section at the outer streamline of the impeller (20) of the invention. Accordingly, the said impeller cover (40) is positioned in the volute (12) adjacent to the impeller (20). The impeller cover (40) is provided with at least one suction eye (41). The said suction eye (41) allows the fluid to be taken into the impeller (12). The fluid entering from the suction eye (41) is energized by the impeller (20) and transferred to the volute (12) and connected to the line to be used with the discharge opening (13). The impeller cover (40) is provided with at least one shaped part (42). The said shaped part (42) is positioned on the lateral surface of the impeller cover (40) facing the impeller (20). The shaped part (42) is provided such that it conforms to the blade structure of the impeller (20), the protrusion form (33), and the connection part (22). Thus, the free movement of the fluid taken between the impeller (20) and the impeller cover (40) is minimized and leaks from the pressure side to the suction side are prevented. There is at least one cutting channel (43) on the shaped part (42). The said cutting channel (43) is a recess-shaped opening provided on the shaped part (42). In a preferred embodiment of the invention, on the shaped part (42), there are multiple cutting channels (43), in particular 6. The cutting channel (43) is also placed on the shaped part (42) in a substantially curved manner following the local flow pattern. It is ensured that the solid particles taken between the impeller cover (40) and the impeller (20) are compressed and cut with the rotation effect of the impeller (20).

It is ensured that the fluid taken from the suction eye (41) to the volute (12) on the pump (10) is pressurized and transported with this whole embodiment. In a possible embodiment, in the event that there are solid elements—such as fibrous waste parts—in the transported fluid, it is ensured that they are cut and shredded by compressing between the special form of the first blade (30a), second blade (30b) and third blade (30c) between the impeller (20) and the impeller cover (40) and the special form of the impeller cover (40). Thus, it is ensured that the clogging problems of the pump (10) are prevented.

The protection scope of the invention is specified in the attached claims and cannot be strictly limited to those explained for illustrative purposes in this detailed description. It is evident that those skilled in the art may exhibit similar embodiments in light of the above-mentioned facts without drifting apart from the main theme of the invention.

What is claimed is:

1. A pump for transporting fluid between two predetermined locations by converting mechanical energy into flow energy using at least one drive unit, the pump comprising:
    at least one impeller, the impeller comprising:
    at least one hub, and
    at least one connection part for connecting the impeller with the at least one drive unit on the at least one hub,
    at least one blade at least partially wrapped around the at least one connection part and extending along a streamline,
    at least one leading edge on a side of the at least one blade facing the connection part, wherein the at least one leading edge is provided as a protrusion extending along a vertical axis as the at least one leading edge moves away from the at least one hub and is oriented such that, when viewed along the axis of rotation of the impeller, the leading edge is curved opposite to the direction of rotation of the impeller;
    a trailing edge on the at least one blade, wherein the at least one blade is configured such that, during operation, a region of reduced pressure is formed adjacent to the blade between the leading edge and the trailing edge;
    at least one impeller cover positioned adjacent to the impeller within a volute of the pump;
    at least one shaped part formed on a surface of the impeller cover facing the impeller, the shaped part being formed in accordance with a surface form of the impeller;
    at least one cutting channel formed as a recess in the at least one shaped part, the cutting channel being configured to allow solid elements in the fluid to break down as the impeller rotates.

2. The pump according to claim 1, wherein the at least one blade comprises at least a first blade, a second blade, and a third blade.

3. The pump according to claim 1, wherein the at least one cutting channel has a predetermined curved form.

4. The pump according to claim 1, wherein the at least one shaped part includes six cutting channels.

5. The pump according to claim 1, wherein a cross section of the at least one leading edge is elliptical.

* * * * *